(12) United States Patent
Giese et al.

(10) Patent No.: US 9,427,826 B2
(45) Date of Patent: Aug. 30, 2016

(54) HAND-GUIDED MARKING SYSTEM

(75) Inventors: Mario Giese, Heroldsbach (DE); Stephan Berthold, Veitsbronn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 335 days.

(21) Appl. No.: 14/346,493

(22) PCT Filed: Jun. 18, 2012

(86) PCT No.: PCT/EP2012/061546
§ 371 (c)(1),
(2), (4) Date: Mar. 21, 2014

(87) PCT Pub. No.: WO2013/041253
PCT Pub. Date: Mar. 28, 2013

(65) Prior Publication Data
US 2014/0231397 A1 Aug. 21, 2014

(30) Foreign Application Priority Data
Sep. 23, 2011 (DE) .................. 10 2011 083 252

(51) Int. Cl.
| | |
|---|---|
| B23K 26/03 | (2006.01) |
| B23K 26/08 | (2014.01) |
| B23K 26/36 | (2014.01) |
| B23K 26/02 | (2014.01) |
| G06K 1/12 | (2006.01) |
| G06K 5/00 | (2006.01) |

(52) U.S. Cl.
CPC ............. *B23K 26/365* (2013.01); *B23K 26/02* (2013.01); *B23K 26/03* (2013.01); *B23K 26/032* (2013.01); *B23K 26/08* (2013.01); *B23K 26/0869* (2013.01); *B23K 26/36* (2013.01); *B23K 26/362* (2013.01); *G06K 1/126* (2013.01); *G06K 5/00* (2013.01)

(58) Field of Classification Search
CPC .... B23K 26/02; B23K 26/03; B23K 26/032; B23K 26/08; B23K 26/36; B23K 26/362
USPC ......................................... 219/121.6, 121.68
See application file for complete search history.

(56) References Cited

U.S. PATENT DOCUMENTS

| | | | | |
|---|---|---|---|---|
| 4,905,690 | A | * 3/1990 | Ohshiro | A61N 5/0616 607/89 |
| 6,818,859 | B2 | * 11/2004 | Lodge | B01L 3/5453 219/121.69 |

(Continued)

FOREIGN PATENT DOCUMENTS

| | | |
|---|---|---|
| CN | 101590744 | 12/2009 |
| CN | 201566213 | 9/2010 |

(Continued)

*Primary Examiner* — Samuel M Heinrich
(74) *Attorney, Agent, or Firm* — Volpe and Koenig, P.C.

(57) ABSTRACT

A hand-guided marking system (1) is disclosed, which is furnished with a radiation source (2) for applying a marking (100) to a surface (101) of a workpiece (102). A camera (4) and at least one illumination device (6) are used for recording a part of the surface (101) of the workpiece (102). A protective housing (10) is mounted on a carrier frame (12) and has an opening (14) in the protective housing (10) that is located opposite the surface (101) of the workpiece (102). The beam source (2) is positioned in the carrier frame (12) in such manner that an optical axis (16) of the beam source (2) passes through the opening of the protective housing (10).

9 Claims, 3 Drawing Sheets

(56) References Cited

U.S. PATENT DOCUMENTS

| | | | |
|---|---|---|---|
| 8,492,240 B2 * | 7/2013 | Mueller | H01L 23/544 257/53 |
| 2004/0099724 A1 | 5/2004 | Ulrich et al. | |

FOREIGN PATENT DOCUMENTS

| | | |
|---|---|---|
| CN | 201646006 | 11/2010 |
| CN | 201721134 | 1/2011 |
| DE | 19915071 | 10/2000 |
| DE | 10059246 | 6/2002 |
| DE | 10308684 | 9/2004 |
| DE | 10153943 | 4/2006 |
| DE | 102008000503 | 9/2009 |
| EP | 2146301 | 1/2010 |

* cited by examiner

HAND-GUIDED MARKING SYSTEM

The present invention relates to a hand-guided marking system. In particular, the invention relates to a hand-guided marking system that is equipped with a radiation source for applying a marking on a surface of a workpiece. The hand-guided marking system is further provided with a camera and at least one lighting device for lighting at least one part of the surface of the workpiece.

BACKGROUND

From the prior art it is known to apply safety designations on workpieces. Usually, these safety designations are applied by a laser on the surface of the workpiece. These safety designations or markings are also called "data matrix codes" (DMC).

From the German publication DE 10 2008 000 503 A1, a method for verifying data matrix codes is known. During a processing procedure, a marking is applied on workpieces. The workpiece then can be permanently identified with reference to this marking. For verifying the applied marking, a camera is connected to the laser marking system. The data matrix code applied to the workpiece is read with this camera and compared with the desired code and verified.

The German publication DE 10153943 A1 discloses a laser writer and a method for applying a matrix code on an object. The device contains a laser for generating a laser beam and a deflection unit for focusing and guiding the laser beam within a marking field on the object or workpiece. For reading the matrix code generated on the object, the laser writer also contains a reading device. The field of view of the reading device can be set by the deflection unit at least to one part of the marking field that contains the matrix code. For steering the laser to the marking field or for the simultaneous guiding of the light from the marking field to the reading device, a dichroic beam splitter is provided in the beam path.

The German publication DE 103 08 684 A1 discloses a method for the quality inspection of two-dimensional matrix codes on metallic workpieces with an image-processing device. The matrix code is applied in the form of marking dots on the metallic workpieces. The embossing procedure for the marking dots is performed with reference to specified digital position data by a marking tool. Then the corresponding image data for testing is recorded by the image processing device only at the positions specified by the position data.

US Patent application US 2004/0099724 A1 discloses a workpiece with a machine readable data carrier. The data carrier comprises a two-dimensional matrix code. The matrix code is produced on the workpiece by means of holes. A mechanical processing is preferred, because the burn-in process for the code by a laser can lead to structural changes of the material. Before the workpiece is mounted in the holder for the application of the matrix code, the matrix code is checked by a reading device.

DE 100 59 246 A1 is likewise concerned with a marking system in which a radiation source emitting a laser beam is arranged within a housing. In addition, a scanning device that steers the laser beam in a protective housing is located in the housing.

From DE 199 15 071 A1, another marking system is known in which a radiation source is arranged within a protective housing on a guide and not, like in the marking system according to the invention, in a support frame outside of the protective housing.

SUMMARY

The object of the invention is to create a hand-guided marking system in which different radiation sources can be used in a simple way and satisfies the safety conditions for the radiation sources used.

The objective is achieved by a hand-guided marking system having one or more features of the invention.

The hand-guided marking system supports a protective housing on a support frame. The protective housing has an opening that is opposite the surface of the workpiece on which the marking is to be applied. The radiation source can be mounted in the support frame such that an optical axis of the radiation source runs through the opening of the protective housing.

The radiation source is a laser that is mounted in a laser carrier in the support frame. The laser carrier has a laser base that supports several guide elements for the insertion of the radiation source. The laser base further has an opening that is used for holding at least one part of an optical system of the radiation source.

The laser carrier is provided with at least one handle element for manual handling. An attachment for machine handling can also be mounted. On the attachment, the hand-guided marking system can be lowered onto the workpiece on whose surface the marking is to be applied. Preferably, the markings to be applied are data matrix codes (DMC). For testing the quality of the applied marking, a camera is mounted on the protective housing. By means of the camera, the light reflected back from the surface of the workpiece is recorded and thus the applied marking is imaged on an image capture chip of the camera. It is apparent for someone skilled in the art that the camera includes the optical system necessary for the imaging.

A pivoting mirror is mounted in the interior of the protective housing. The pivoting mirror can be pivoted into a first position and into a second position. In the first position, the light from the radiation source runs along the optical axis of the radiation source to the surface of the workpiece, in order to form the corresponding marking there. In the second position, the mirror is arranged such that the light from the radiation source is blocked and the light reflecting from the surface of the workpiece is directed onto the camera.

The protective housing itself carries a base plate in which the opening is provided for the passage of the light of the radiation source. The opening of the base plate of the protective housing is opposite the surface of the workpiece. At least one safety initiator is mounted on at least one outer wall of the protective housing. The safety initiator determines whether the hand-guided marking system is positioned correctly with respect to the workpiece. This prevents an output of light from the radiation source out of the protective housing and switches off the radiation source if the protective housing is not mounted correctly. The radiation source is switched off based on the signal of the safety initiator. Another possibility is to pivot the mirror into the second position based on the signal from the safety initiator and in this way to block the light coming from the radiation source.

The lighting device is arranged on at least one inner wall of the protective housing, in order to provide the diffuse lighting required for an image capture by the camera.

For applying the safety markings on the surface of workpieces, lasers are used as the radiation sources. The safety markings are designated as data matrix codes (DMC). For applying the safety designation or marking, portable systems are used. The hand-guided marking system according to the invention is provided with a protective housing. This protective housing has all of the required safety devices (especially the safety initiators). The camera is used for inspecting the safety marking applied to the surface of the workpiece and is here mounted directly on the protective housing. The hand-guided marking system is suitable especially for the laser marking of large bearings, wherein, due to the dimensions of the bearings, it does not make sense to build corresponding stationary and fixed housings or arrangements in order to provide the workpieces with the laser marking.

BRIEF DESCRIPTION OF THE DRAWINGS

Below, embodiments should explain the invention and its advantages with reference to the accompanying figures. The size relationships in the figures do not always correspond to the real size relationships, because some shapes are shown simplified and other shapes are shown enlarged with respect to the other elements for better illustration. In the drawings.

For elements of the invention that are identical or have identical actions, identical reference symbols are used. Moreover, for the sake of clarity, only reference symbols that are required for describing the particular figure are shown in the individual figures.

DETAILED DESCRIPTION OF THE PREFERRED EMBODIMENTS

Figure 1:
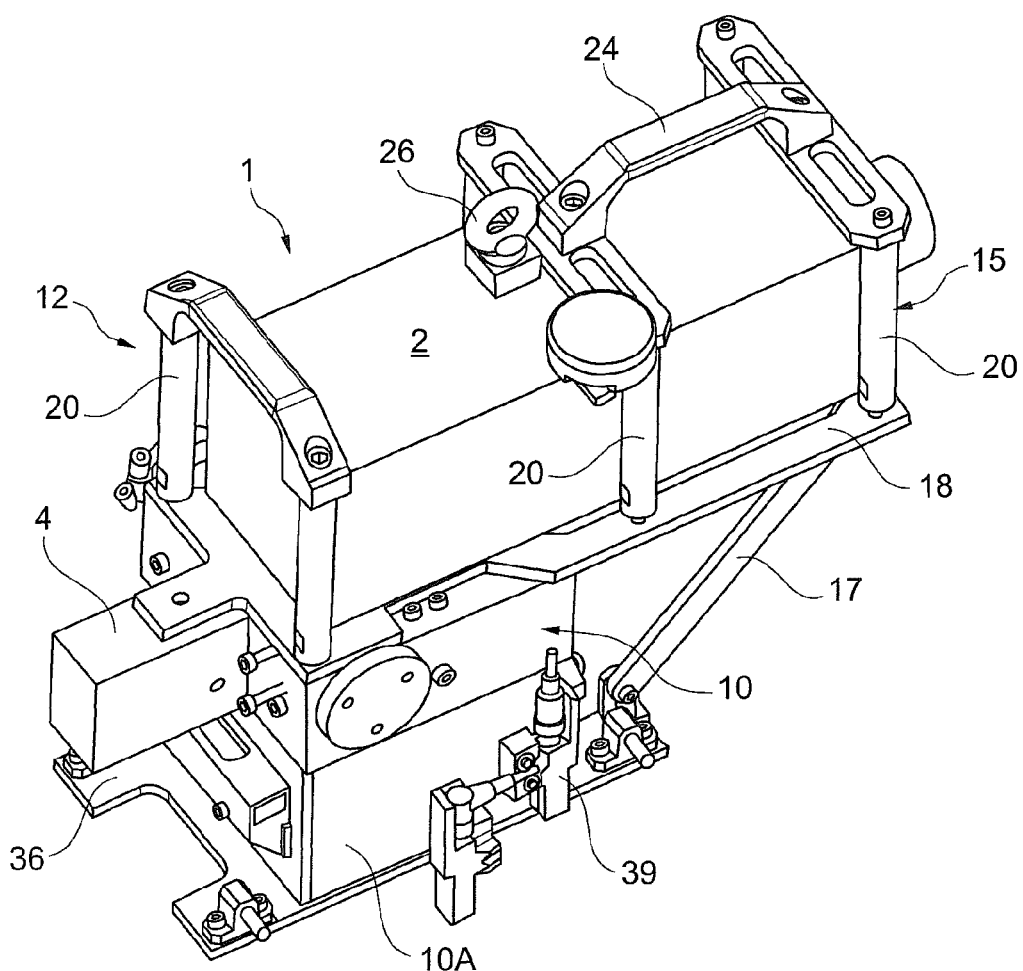
FIG. 1 is a perspective view of the hand-guided marking system according to the invention.
Figure 6:
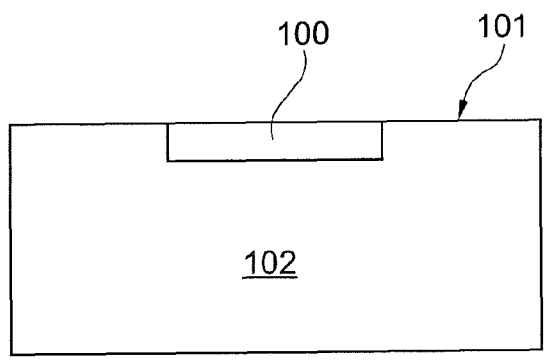
FIG. 6 is a schematic view of a part of the workpiece in which a marking is formed on the surface of the workpiece.

FIG. 1 shows a perspective view of the hand-guided marking system 1 according to the invention. The hand-guided marking system 1 comprises a radiation source 2 that is designed as a laser. The hand-guided marking system 1 further comprises a camera 4 with which the markings 100 applied on the surface 101 of a workpiece 102 can be read or verified (see, in this context, FIG. 6). The hand-guided marking system 1 is further provided with a protective housing 10. The protective housing 10 is mounted on a support frame 12. The radiation source 2 is installed on the upper area of the support frame 12. The radiation source 2 is carried by a laser base 18 that is part of the laser carrier 15. The laser carrier 15 is connected to the support frame 12. On the laser base 18 there are several guide elements 20 with which a lateral guide of the radiation source 2 is achieved. The orientation of the radiation source 2 in the hand-guided marking system 1 is likewise simplified by the guide elements 20. In the upper area of the hand-guided marking system 1 there is at least one handle element 24. The hand-guided marking system 1 can be oriented with respect to the surface 101 of the workpiece 102 with at least one handle element 24.

For supporting the handling of the hand-guided marking system 1, an attachment 26 is further provided with which machine handling of the hand-guided marking system 1 is also enabled. The interplay of the handle element 24 and the attachment 26 makes possible an easy, simple, and bodily-protective positioning of the hand-guided marking system 1 with respect to the part of the surface 101 of the workpiece 102 on which the marking 100 is to be applied.

In the area of the protective housing 10 that is opposite the surface 101 of the workpiece 102, a base plate 36 is provided. Between the base plate 36 and the laser base 18 there is a brace 17 that provides for additional mechanical stabilization of the hand-guided marking system 1. In the embodiment shown here, the protective housing 10 has a rectangular shape. A safety initiator 39 is mounted on at least one outer wall 10A of the protective housing 10. With the safety initiator 39 it is possible to test and determine the correct mounting of the hand-guided marking system 1 on the workpiece 102 to be marked. The safety initiator 39 can be formed as an inductive proximity switch that monitors automatically. According to a preferred embodiment, two of these safety initiators 39 are provided in order to monitor the placement directly on the workpiece 102 to be marked. A safety initiator 39 here monitors that the hand-guided marking system 1 is located in a part receptacle (is placed on the bearing). Thus, the hand-guided marking system 1 or the radiation source 2 is placed on the workpiece 102 in a controlled way. By means of the controlled placement, it is possible for no light to be discharged from the radiation source 2 out of the interior of the protective housing 10. As a function of the determination by the safety initiator 39, a corresponding action thus can be triggered, in order to guarantee the safety conditions for the operation of the guided marking system 1.

Figure 2:
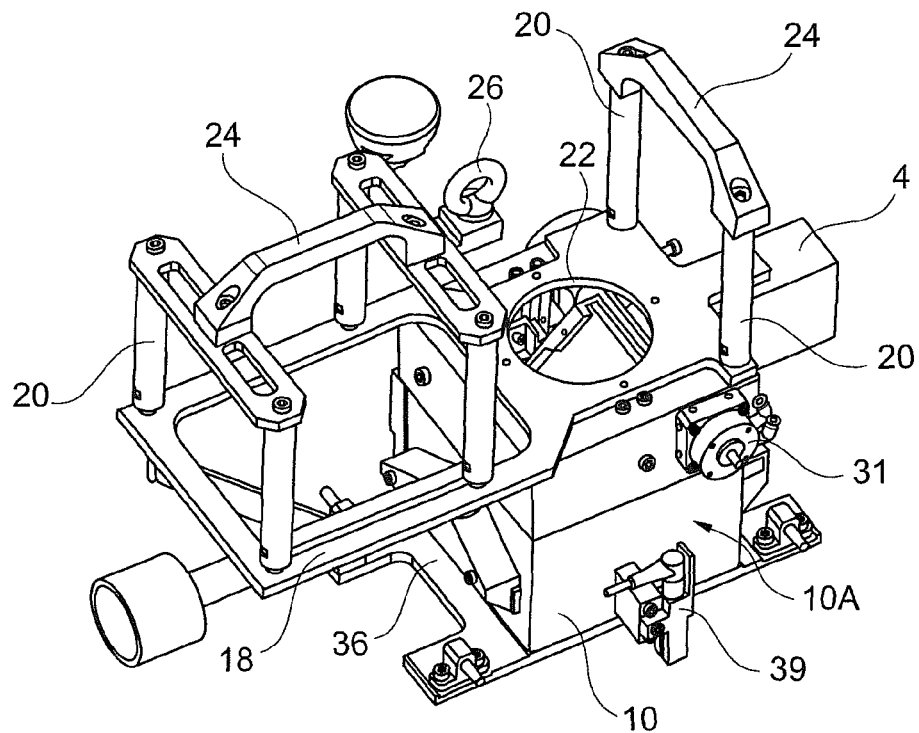
FIG. 2 is a perspective view of the support frame from above, wherein no radiation source is inserted in the support frame.

FIG. 2 shows a perspective view of the support frame 12 from a view from above. As already mentioned in the description to FIG. 1, the protective housing 10 is provided underneath the laser base 18. The protective housing 10 also carries the camera 4. In the laser base 18, an opening 22 is formed into which at least one part of the optical system 25 of the radiation source 2 projects (see here FIG. 4 and FIG. 5). The protective housing 10 is closed by a base plate 36. The at least one safety initiator 39 is mounted on the outer wall 10A of the protective housing 10. A drive 31 is also provided on the protective housing 10. With this drive, a mirror 30 can be pivoted from a first position $30_1$ into a second position $30_2$ (see here FIG. 4 and FIG. 5).

Figure 3:
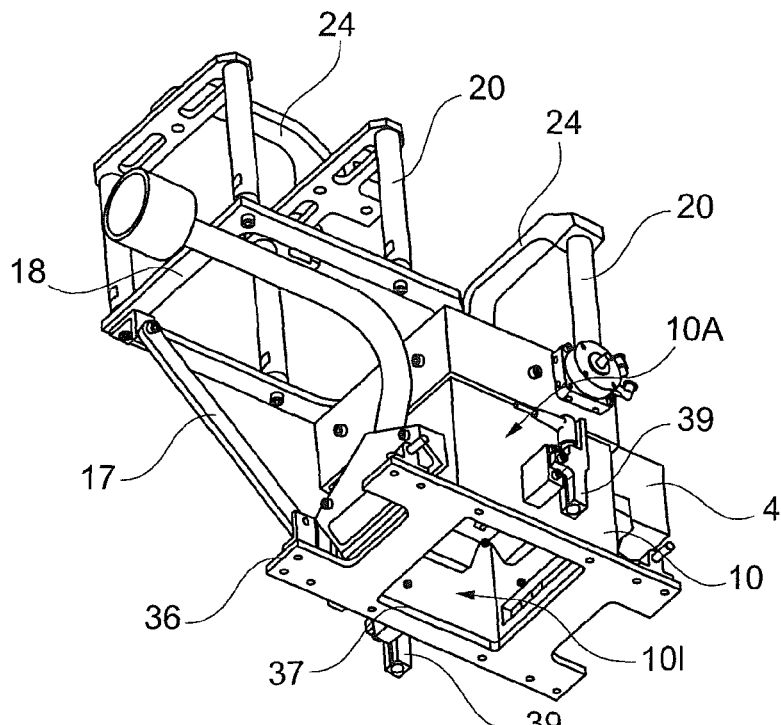
FIG. 3 is a perspective view of the support frame from below, wherein the opening in the base plate of the protective housing can be seen.

In FIG. 3, the support frame 12 is shown in a perspective view from below. The base plate 36 has an opening 37. The opening 37 is thus arranged opposite the area of the surface 101 of the workpiece 102 on which the marking 100 is to be applied. At least one lighting device 6 is provided on at least one inner wall 10I of the protective housing 10. By means of the lighting device 6 (see here FIG. 4 and FIG. 5), it is possible to light the marking 100 applied on the surface 101, so that an image of the marking 100 of sufficient quality can be achieved with the camera 4. This ultimately produces reliable readability of the marking 100.

Figure 4:
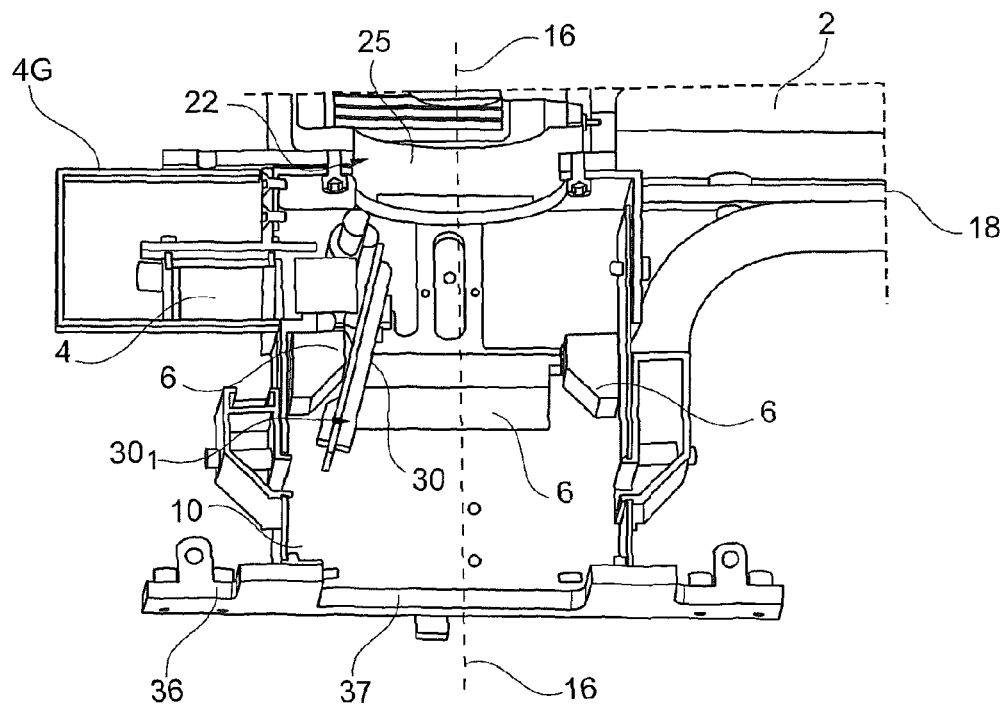
FIG. 4 is a section view through the protective housing of the hand-guided marking system, wherein the pivoting mirror is located in the first position.

FIG. 4 shows a section view through the area of the hand-guided marking system 1 that essentially shows the protective housing 10. The optical system 25 of the radiation source 2 here reaches, in part, through the opening 22 in the laser base 18. The optical system 25 of the radiation source 2 thus defines an optical axis 16 along which the light of the radiation source 2 propagates. In the view shown in FIG. 4, the mirror 30 is in the first position 30₁. The first position 30₁ means that the light provided by the radiation source 2 can propagate unimpaired along the optical axis 16 and reaches the surface 101 of the workpiece 102 through the opening 37 of the base plate 36.

Figure 5:
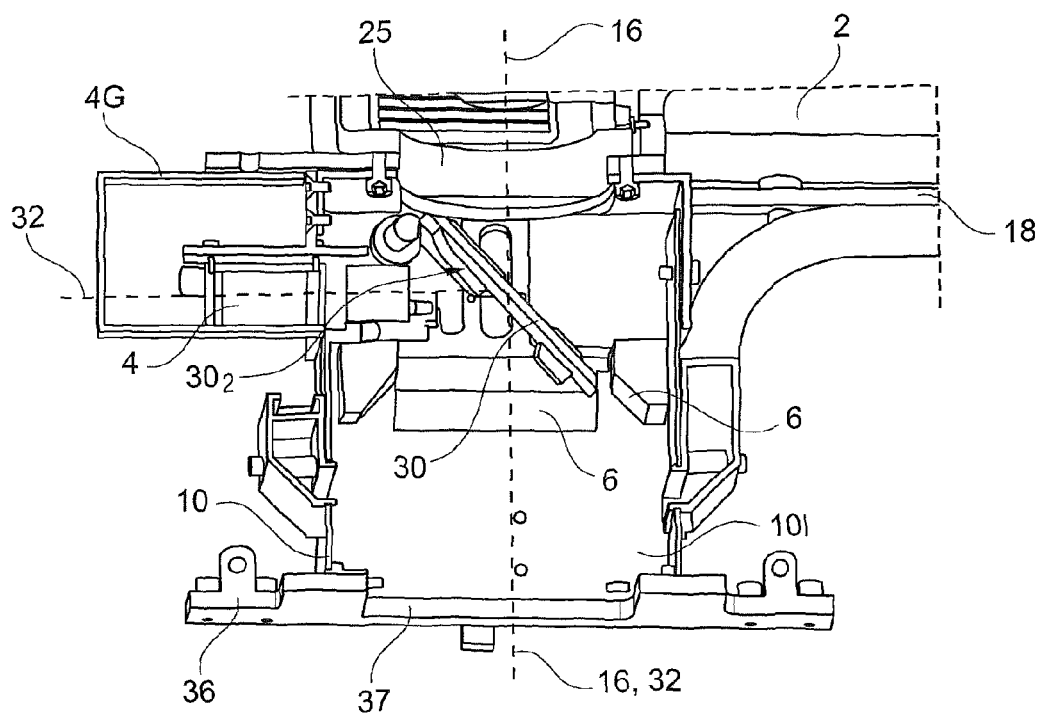
FIG. 5 is a section view of the protective housing shown in FIG. 4, wherein the pivoting mirror is located in the second position.

In FIG. 5, the situation is shown that the mirror 30 is pivoted into the second position 30₂. If the mirror 30 is in the second position 30₂, the light of the radiation source 2 that propagates along the optical axis 16 is blocked. With the lighting device 6 mounted on the inner wall 10I of the protective housing 10, the surface 101 of the workpiece 102 can be lighted in a suitable way, so that a qualitatively sufficient detection of the marking 100 on the surface 101 of the workpiece 102 is possible. The light emerging from the surface 101 of the workpiece 102 reaches through the opening 37 in the base plate 36 along the optical axis 32 of the camera 4 to the camera 4. As can be seen from FIGS. 4 and 5, the camera 4 with a camera housing 4G is mounted on the protective housing 10.

Through the pivoting of the mirror 30 from the first position 30₁ (writing position of the radiation source 2) into the second position 30₂, it is thus possible that the quality of the written marking 100 can be checked with the camera 4 after the writing of the marking 100 with the radiation source 2. Here it is not necessary to change the hand-guided marking system 1 with respect to its position relative to the writing marking 100. Through the base plate 36 it is guaranteed that no light of the radiation source 2 reaches the outside. Thus the safety or laser safety is guaranteed in the handling of the hand-guided marking system 1. Furthermore, the base plate 36 guarantees that no light from the outside reaches into the interior of the protective housing 10, which guarantees reliable readability of the marking 100 by means of the camera 4, because interfering light from the outside cannot affect the reading.

LIST OF REFERENCE NUMBERS

1 Hand-guided marking system
2 Radiation source
4 Camera
4G Camera housing
6 Lighting device
10 Protective housing
10A Outer wall of the protective housing
10I Inner wall of the protective housing
12 Support frame
14 Opening
15 Laser carrier
16 Optical axis of the radiation source
17 Brace
18 Laser base
20 Guide element
22 Opening
24 Handle element
25 Optical system
26 Attachment
30₁ First position
30₂ Second position
31 Drive
32 Optical axis of the camera
36 Base plate
37 Opening
39 Safety initiator
100 Marking
101 Surface
102 Workpiece

The invention claimed is:

1. A hand-guided marking system, comprising a radiation source for applying a marking on a surface of a workpiece, a camera, and at least one lighting device that lights at least one part of the surface of the workpiece, a protective housing mounted on a support frame, an opening of the protective housing located opposite the surface of the workpiece, and the radiation source is mounted in the support frame such that an optical axis of the radiation source runs through the opening of the protective housing.

2. The hand-guided marking system according to claim 1, wherein the radiation source is a laser that is mounted in the support frame in a laser carrier.

3. The hand-guided marking system according to claim 2, wherein the laser carrier comprises a laser base that carries several guide elements for inserting the radiation source and the laser base has a shaped opening that holds at least one part of an optical system of the radiation source.

4. The hand-guided marking system according to claim 2, wherein the laser carrier is connected to a handle element for manual handling or an attachment for machine handling.

5. The hand-guided marking system according to claim 1, wherein the camera is mounted on the protective housing.

6. The hand-guided marking system according to claim 5, wherein a pivoting mirror is mounted in an interior of the protective housing, wherein, in a first position, the pivoting mirror does not block light in the optical axis of the radiation source and, in a second position, directs an optical axis of the camera onto the surface of the workpiece.

7. The hand-guided marking system according to claim 1, wherein the protective housing carries a base plate in which the opening is formed that is set opposite the surface of the workpiece.

8. The hand-guided marking system according to claim 7, wherein at least one safety initiator is formed on at least one outer wall of the protective housing and the safety initiator determines a correct positioning of the hand-guided marking system with respect to the workpiece, in order to thus prevent a discharge of light of the radiation source from the protective housing and to switch off the radiation source.

9. The hand-guided marking system according to claim 1, wherein the lighting device is arranged on at least one inner wall of the protective housing in a dark-field arrangement for image capture by the camera.

* * * * *